(12) United States Patent
Wood (10) Patent No.: US 8,128,406 B2
(45) Date of Patent: Mar. 6, 2012

(54) PREDICTIVE ASSESSMENT OF READING

(75) Inventor: Frank Balch Wood, Winston-Salem, NC (US)

(73) Assignee: Wake Forest University, Winston-Salem, NC (US)

( * ) Notice: Subject to any disclaimer, the term of this patent is extended or adjusted under 35 U.S.C. 154(b) by 1122 days.

(21) Appl. No.: 10/389,298

(22) Filed: Mar. 14, 2003

(65) Prior Publication Data

US 2004/0224291 A1    Nov. 11, 2004

Related U.S. Application Data

(60) Provisional application No. 60/364,695, filed on Mar. 15, 2002.

(51) Int. Cl.
G09B 5/00 (2006.01)
(52) U.S. Cl. .......... 434/169; 434/156; 434/157
(58) Field of Classification Search .......... 434/169, 434/178, 185, 156, 179
See application file for complete search history.

(56) References Cited

U.S. PATENT DOCUMENTS

| | | | | |
|---|---|---|---|---|
| 3,745,674 A * | 7/1973 | Thompson et al. | ........... | 434/314 |
| 5,002,283 A * | 3/1991 | Langham et al. | ........... | 273/252 |
| 5,302,132 A * | 4/1994 | Corder | ........... | 434/156 |
| 5,303,327 A * | 4/1994 | Sturner et al. | ........... | 704/270 |
| 5,387,104 A * | 2/1995 | Corder | ........... | 434/169 |
| 5,799,267 A * | 8/1998 | Siegel | ........... | 434/169 |
| 5,957,699 A * | 9/1999 | Peterson et al. | ........... | 434/350 |
| 6,009,397 A * | 12/1999 | Siegel | ........... | 434/169 |
| 6,120,298 A * | 9/2000 | Jenkins et al. | ........... | 434/236 |
| 6,224,384 B1 * | 5/2001 | Jenkins et al. | ........... | 434/185 |
| 6,227,863 B1 * | 5/2001 | Spector | ........... | 434/167 |
| 6,260,022 B1 * | 7/2001 | Brown | ........... | 705/2 |
| 6,299,452 B1 * | 10/2001 | Wasowicz et al. | ........... | 434/178 |
| 6,334,776 B1 * | 1/2002 | Jenkins et al. | ........... | 434/169 |
| 6,364,666 B1 * | 4/2002 | Jenkins et al. | ........... | 434/156 |
| 6,511,324 B1 * | 1/2003 | Wasowicz | ........... | 434/167 |
| 6,517,351 B2 * | 2/2003 | Spector | ........... | 434/169 |
| 6,585,519 B1 * | 7/2003 | Jenkins et al. | ........... | 434/236 |
| 6,669,479 B1 * | 12/2003 | Jenkins | ........... | 434/178 |
| 6,676,413 B1 * | 1/2004 | Best et al. | ........... | 434/178 |
| 6,726,486 B2 * | 4/2004 | Budra et al. | ........... | 434/169 |
| 6,793,498 B1 * | 9/2004 | Nunes | ........... | 434/322 |
| 6,830,452 B2 * | 12/2004 | Spector | ........... | 434/169 |
| 2002/0160347 A1 * | 10/2002 | Wallace et al. | ........... | 434/322 |
| 2002/0164563 A1 * | 11/2002 | Wasowicz et al. | ........... | 434/178 |

OTHER PUBLICATIONS

Qian, Jiahe. "Data Adjustment for Educational Assessment." Educational Testing Service. 1999. <URL: www.amstat.org/Sections/Srms/Proceedings/papers/1999_123.pdf> [Retreived Feb. 27, 2006].*

StatSoft. "Multiple Regression." 1984-2002. <URL: http://www.statsoft.com/textbook/stmulreg.html> [Retreived Mar. 1, 2006].*

(Continued)

*Primary Examiner* — Robert J Utama (74) *Attorney, Agent, or Firm* — Myers Bigel Sibley & Sajovec (57) ABSTRACT

Methods and systems for predicting future and concurrent reading ability are provided. A first variable comprising a measurement of picture vocabulary, a second variable comprising a measurement of phonemic awareness, a third variable comprising a measurement of rapid naming, and a fourth variable comprising a measurement of single letter or word naming are detected. An assessment of concurrent or future reading ability is generated from the first, second, third and fourth variables. The assessment of concurrent or future reading ability may be carried out with an empirically-based model of actual clinical experience or a regression model.

65 Claims, 5 Drawing Sheets

OTHER PUBLICATIONS

"Test Blueprint." Educational Technologies at Virginia Tech. 2002. <URL: http://www.edtech.vt.edu/edtech/id/assess/blueprint.html> [Retreived Mar. 1, 2006].*

Swan, Denise and Goswami, Usha. Picture Naming Deficits in Developmental Dyslexia: The Phonological Representation o Hypothesis. Departement of Experimental Psychology, Academy Press 1997.*

Badian, Nathlie A. "Preschool Prediction: Orthographic and Phonological Skills, and Reading" *Annals of Dyslexia* 44:3-25 (1994).

Badian, Nathlie A. "Predicting Reading Ability Over the Long Term: The Changing Roles of Letter Naming, Phonological Awareness and Orthographic Processing" *Annals of Dyslexia* 45:79-96 (1995).

Catts et al. "Estimating the Risk of Future Reading Difficulties in Kindergarten Children A Research-Based Model and Its Clinical Implementation" *Language, Speech, and Hearing Services in Schools* 32:38-50 (2001).

Elbro et al. "Predicting dyslexia from kindergarten: The importance of distinctness of phonological representations of lexical items" *Reading Research Quarterly* 33(1):36-60 (1998).

Flynn, Jane "From Identification to Intervention—Improving Kindergarten Screening for Risk of Reading Failure" *Prediction and Prevention of Reading Failure* Chapter 6, 133-152 (2000).

Meyer et al. "Selective Predictive Value of Rapid Automatized Naming in Poor Readers" *Journal of Learning Disabilities* 31(2):106-117 (1998).

Scarborough, Hollis S. "Prediction of Reading Disability from Familial and Individual Differences" *Journal of Educational Psychology* 81(1):101-108 (1989).

Scarborough, Hollis S. "Predicting the Future Achievement of Second Graders with Reading Disabilities: Contributions of Phonemic Awareness, Verbal Memory, Rapid Naming, and IQ" *Annals of Dyslexia* 48:115-136 (1998).

Sénéchal et al. "Differential effects of home literacy experiences on the development of oral and written language" *Reading Research Quarterly* 33(1):96-116 (1998).

Shaw et al. "Technical Report DIBELS Oral Reading Fluency-Based Indicators of Third Grade Reading Skills for Colorado State Assessment Program (CSAP)" 10 pp. (2002).

Committee on the Prevention of Reading Difficulties in Young Children "Preventing Reading Difficulties in Young Children" National Academy Press, Washington DC 16 pp. (1998) <http://www.nap.edu/readingroom/books/reading/>.

Texas Education Agency "Technical Report—Texas Primary Reading Inventory" 1-91 (1998 edition).

Torgesen, Joseph K. "Catch Them Before They Fall—Identification and Assessment to Prevent Reading Failure in Young Children" *American Educator/American Federation of Teachers* 22(1-2):32-39 (1998).

Adams et al; National Reading Panel, "Teaching Children to Read" An Evidence-Based Assessment of the Scientific Research Literature of Reading and Its Implications for Reading Instruction; Report of the National Reading Panel.

"Guidance for the Reading First Program"; U.S. Department of Education Office of Elementary and Secondary Education (Apr. 2002).

S. E. Stothard et al; A Comparison of Phonological Skills in Children with Reading Comprehension Difficulties and Children with Decoding Difficulties; *J. Child Psycol. Psychist*. vol. 56, No. 3. pp. 399-408 (1995).

Kate Nation et al; "Hidden Language Impairments in Children: Parallels Between Poor Reading Comprehension and Specific Language Impairment"; *Jounal of Speech, Language, and Hearing Research*, vol. 47 Feb. 2004 pp. 199-211.

Hugh W. Catts et al; "Language Deficits in Poor Comprehenders: A Case for the Simple View of Reading"; *Journal of Speech, Language, and Hearing Research*, vol. 49, Apr. 2006 pp. 278-293.

Jack M. Fletcher et al; "Cognitive Profiles of Reading Disability: Comparisons of Discrepancy and Low Achievement Definitions"; *Journal of Educational Psychology*, vol. 86, No. 1, pp. 6-23 (1994).

Kate Nation et al.; "Individual Differences in Contextual Facilitation: Evidence from Dyslexia and Poor Reading Comprehension"; *Child Development*, vol. 69, No. 4, pp. 996-1011 (Aug. 1998).

Kate Nation; "Connections Between Language and Reading in Children with Poor Reading Comprehension"; *Psychology Press Taylor & Francis Group* pp. 41-54 (Reprinted 2009).

Valerie Mutter et al; "Phonemes, Rimes, Vocabulary, and Grammatical Skills as Foundations of Early Reading Development: Evidence From a Longitudinal Study"; Developmental Psychology, vol. 40, No. 5, pp. 665-681 (2004).

Peggy McCardle et al; "Predicting, Explaining, and Preventing Children's Reading Difficulties*"; Learning Disabilities Research & Practice, 16(4), pp. 230-239 (2001).

Virginia A. Mann; "Phoneme Awareness and Future Reading Ability"; Journal of Learning Disabilities; vol. 26, No. 4, pp. 259-269 (Apr. 1993).

Hollis S. Scarborough; Predicting the Future Achievement of Second Graders with Reading Disabilities: Contributions of Phonemic Awareness, Verbal Memory, Rapid Naming, and IQ; Annals of Dyslexia, vol. 48, pp. 115-136; (1998).

Susan E. Stothard et al; "A Comparison of Phonological Skills in Children with Reading Comprehension Difficulties and Children with Decoding Difficulties"; J. Child Psychol, Psychol, vol. 36. No. 3., pp. 399-408 (1995).

Hugh W. Catts et al; "Estimating the Risk of Future Reading Difficulties in Kindergarten Children: A Research-Based Model and Its Clinical Implementation"; Language, Speech, and Hearing Services in Schools, vol. 32, pp. 38-50, Jan. 2001 (American Speech-Language-Hearing Association.

Christopher Schatschneider et al; "Kindergarten Prediction of Reading Skills: A Longitudinal Comparative Analysis"; Journal of Educational Psychology (2004), vol. 96. No. 2, pp. 265-282.

Rollanda E. O'Connor et al.; "Prediction of Reading Disabilities in Kindergarten and First Grade"; Scientific Studies of Reading, 3(2), pp. 159-197. (2000).

* cited by examiner

FIG. 5 ated to the present invention.

PREDICTIVE ASSESSMENT OF READING

RELATED APPLICATIONS

This application claims priority to U.S. Patent Application No. 60/364,695 filed Mar. 15, 2002, the disclosure of which is incorporated herein by reference in its entirety.

FIELD OF THE INVENTION

The present invention concerns diagnostic systems and methods for testing and predicting concurrent or future reading ability.

BACKGROUND OF THE INVENTION

Learning to read is one of the most fundamental skills important to educational success. Reading problems may lead to academic and vocational underachievement, and may be a risk factor for various problems including subsequent school drop out, delinquency, and even depression and suicide.

Early screening to predict future reading ability may be important to preventing the development of learning problems. Identifying children who are at risk of developing reading problems may allow educators to intervene and provide remedial or preventative help to the child.

Various testing methods have been developed to assess and evaluate reading ability. Some tests currently available measure reading directly, but do not identify the underlying weaknesses that cause a low reading score. Other tests purport to identify reading weaknesses, and some tests may give guidelines for remedial instructions. Many of these tests are inconvenient and time consuming to administer. However, few tests currently available have research-documented concurrent predictive validity and none combine future prediction with high accuracy.

Accordingly, there remains a need for new ways to identify children who are at risk of developing poor reading skills that is one or more of easy to administer, relatively short in duration, and accurate to predict concurrent, short term, and long term future reading ability.

SUMMARY OF THE INVENTION

Embodiments of the current invention are directed to methods and systems for assessing future reading ability in an individual.

In one aspect of embodiments according to the invention, systems and methods for assessing future reading ability include detecting a first variable comprising a measurement of picture vocabulary, detecting a second variable comprising a measurement of phonemic awareness, detecting a third variable comprising a measurement of rapid naming, detecting a fourth variable comprising a measurement of single letter or word naming, and generating an assessment of future reading ability from the first, second, third and fourth variables.

In another aspect, systems and methods for assessing concurrent or future reading ability include presenting at least four stimuli to an individual. Each stimulus may be associated with at least one of a plurality of assessment tests. The assessment tests may include a first picture vocabulary test, a second phonemic awareness test, a third rapid naming test, and a fourth single letter or word naming test. A system may receive a response from the individual to each stimulus. The system then scores the individual's response to the assessment tests and generates an assessment of future reading ability from the scoring of the individual's responses.

In yet another aspect, systems according to embodiments of the invention include a server computer and one or more client computers that may establish a communications session with the server computer. The server computer may be configured for detecting a plurality of variables from the client computer. The plurality of variables may include a first variable comprising a measurement of picture vocabulary, a second variable comprising a measurement of phonemic awareness, a third variable comprising a measurement of rapid naming, and a fourth variable comprising a measurement of single letter or word naming. The server computer may be further configured for generating a prediction of future reading ability from the first, second, third and fourth variables.

In still another aspect according to embodiments of the invention, a computer program product comprises a computer usable storage medium having computer readable program code embodied in the medium. The computer readable program code may include computer readable program code that detects a plurality of variables. The plurality of variables may include a first variable comprising a measurement of picture vocabulary, a second variable comprising a measurement of phonemic awareness, a third variable comprising a measurement of rapid naming, and a fourth variable comprising a measurement of single letter or word naming. The computer readable program code may include code that generates an assessment of future reading ability from said first, second, third and fourth variables.

The present invention is explained in greater detail in the drawings herein and the specification set forth below.

DETAILED DESCRIPTION

The present invention now is described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout the description of the drawings.

General Description

The present invention includes a method for assessing concurrent or future reading ability in an individual. In certain embodiments, a measurement of some or, preferably, all of four variables is made. The four variables may include a measurement of the individual's skill in the following four areas, picture vocabulary, phonemic awareness, rapid naming, and single letter or word naming. An assessment of concurrent or future reading ability is generated from the four variables. The generation of an assessment of concurrent or future reading ability may be carried out with an empirically-based model of actual clinical experience. The assessment of concurrent or future reading ability may also be carried out with a regression model. The assessment may be useful for recommending specific types of remedial instruction for specific students, according to those students' weaknesses in specific reading related skills. The assessment of concurrent or future reading ability may be used to predict how a student will score on future reading tests if they are not given remedial or preventative help.

Specific types or degrees of remedial instruction may be recommended based on the test scores. For example, some form of remedial instruction may be recommended for individuals scoring below a cut off score, such as below the twenty-fifth percentile. Additional instruction may be recommended for individuals scoring below the tenth percentile, including individual instruction or remedial classes. The remedial instruction recommendations may be based on clinical experience and the extant literature. Remedial instruction recommendations may also be based on the specific scores or combinations of scores in individual tests such as picture vocabulary, phonemic awareness, rapid naming, and single letter or word naming. Furthermore, the type of recommended remedial instruction (such as the subject matter taught or methods of teaching) may be based on specific scores for specific tests or test combinations or scoring ranges. For example, a low score for the phonemic awareness test (e.g., a score below the twenty-fifth percentile) combined with a low score for the rapid naming test could prompt a recommendation that the individual receive some individual help within a mainstream classroom. However, if the rapid naming test score is below the tenth percentile and is combined with a phonemic awareness test score below the twenty-fifth percentile, a recommendation for a relatively high level of individual instruction may be given. At this level of need, the recommendation may include a consideration by the school of a special education classification. On the other hand, if the picture vocabulary test score is low (e.g., below the twenty-fifth percentile), a less intensive program of oral language stimulation may be recommended.

The reading tests can include standard tests such as the Woodcock-Johnson Psycho-Educational Battery Broad Reading Standard Score (WJBR), the Gates-MacGinitie Reading Test (GM), and the California Achievement Test Reading Scale (CATREAD). (Woodcock, R. W., & Johnson, M. B. (1989, 1990) *Woodcock-Johnson psychoeducational battery-revised*. Allen, Tex.: DLM Teaching Resources; Woodcock, R. W., McGrew, K. S., & Mather, N. (2001). *Woodcock-Johnson III*. Itasca, Ill. Riverside Publishing; MacGinitie, W. H., Kamons, J., Kowalski, R. L., MacGinitie, R. K., & MacKay, T. (1978). *Gates-MacGinitie Reading Test*. Riverside Publishing Co.; *California Achievement Test* (1985). Monterey, Calif.: CTB/McGraw-Hill.).

Picture vocabulary, phonemic awareness, rapid naming and single letter or word naming are conventional measurements of ability. Picture vocabulary is considered a measurement of general verbal ability, and may include a picture naming vocabulary test or a picture recognition test. Picture vocabulary may be measured either by asking to the individual to name a pictured object or by requiring an individual to select a picture to match a spoken word. Phonemic awareness refers to the ability to perceive and construct a mental representation of a number, order, or identity of sounds and letters within words, and the accompanying ability to rearrange or otherwise manipulate those sounds. A rapid naming test measures the ability of an individual to quickly name a series of printed items on a page. Single letter or word naming is a test of letter and word recognition that typically involves asking the individual to identify letters and words of increasing difficulty. The various methods for testing ability for picture vocabulary, phonemic awareness, rapid naming, and single letter or word naming are described in detail herein.

In certain embodiments, individuals may be tested to identify those individuals with reading difficulties or a likelihood of developing reading difficulties. A single letter or word naming test has a higher predictive value than picture vocabulary, phonemic awareness, or rapid naming tests given alone. Therefore, individuals may be screened with a single letter or word naming test, so that further testing with the other three variables is only administered if the individual's score on the single letter or word naming test is low. In some embodiments, a stimulus associated with a single letter or word naming test is presented to the individual. The individual responds to the stimulus, for example, by pronouncing a printed stimulus, and the response is scored. If the score of the individual's response is lower than a predetermined amount, at least three additional stimuli are presented to the individual. Each stimulus is associated with at least one of a picture vocabulary test, a phonemic awareness test, and a rapid naming test. The individual responds to each stimulus, and the response is scored. An assessment of future reading ability may be generated from the individual's responses.

In certain embodiments, a system for studying the effect of a variable factor on reading ability is provided. A database for storing a plurality of variables with each one of the categories being stored for each one of a plurality of subjects may include a variable factor and one or more of a first variable comprising a measurement of picture vocabulary, a second variable comprising a measurement of phonemic awareness, a third variable comprising a measurement of rapid naming, a fourth variable comprising a measurement of single letter or word naming, or an assessment of concurrent or future reading ability generated from the first, second, third and fourth variables. A computer processor in communication with the database may be configured for comparing the variable factor with at least one of, any combination of, or all of the first variable, the second variable, the third variable, the fourth variable, or the assessment of concurrent or future reading ability.

In certain embodiments, the database is further configured to store an actual assessment of reading ability. The computer server may be configured to compare one or more of the assessment of future or concurrent reading ability, the actual reading assessment, and the variable factor. The actual reading assessment may be measured subsequent to the assessment of future or concurrent reading ability.

The database may be studied to determine how a variable factor affects the remaining variables. The variable factor may include an epidemiological factor such as socioeconomic factors, health factors, educational factors, environmental factors and the like. Examples of such factors may include whether the subject's mother smoked during pregnancy, dietary data, illness, geographic location, preschool education, and income level. The variable factors may also include factors that have yet to be applied to a particular subject, e.g., an experimental variable such as remedial reading instruction. In other words, a variable factor may be compared with the assessment of future or concurrent reading ability and/or the actual assessment of reading ability to determine if a correlation exists.

The computer processor may be configured for dividing the subjects in the database into a control group and an experimental group. A factor may be applied to the experimental group. For example, the experimental group and the control group may comprise subjects having a particular test score or assessment of concurrent or future reading ability. A remedial educational tool, such as phonics instruction, may be applied to the experimental group and not the control group. An actual reading assessment taken subsequent to the assessment of future or concurrent reading ability may then be added to the database. The actual reading assessments and the future or concurrent reading ability assessment may then be compared to determine whether the experimental group receiving the remedial instruction has higher actual reading assessment compared to the control group. The comparison may take into account the future or concurrent reading ability assessments.

The information in the database may by analyzed using various techniques for data analysis, including data mining techniques. Database mining is a technique to extract previously unrecognized information from data stored in a database through a process of data selection, exploration and building models. Software applications for data mining are available commercially from companies such as the SAS Institute, Inc., Cary, N.C., U.S.A.

Computer Systems and Methods

The present invention may be practiced entirely or in part in a single computer environment or using a client-server architecture. The present invention may be implemented on a client-server system, wherein at least one client computer and at least one server computer is connected over a network, such as the Internet.

The Internet is a worldwide decentralized network of computers having the ability to communicate with each other. The Internet has gained broad recognition as a viable medium for communicating and for conducting business. The World-Wide Web (Web) was created in the early 1990's, and is comprised of server-hosting computers (Web servers) connected to the Internet that have hypertext documents (referred to as Web pages) stored therewithin. Web pages are accessible by client programs (e.g., Web browsers) utilizing the Hypertext Transfer Protocol (HTTP) via a Transmission Control Protocol/Internet Protocol (TCP/IP) connection between a client-hosting device and a server-hosting device. While HTTP and Web pages are the prevalent forms for the Web, the Web itself refers to a wide range of protocols including Secure Hypertext Transfer Protocol (HTTPS), File Transfer Protocol (FTP), and Gopher, and Web content formats including plain text, HyperText Markup Language (HTML), Extensible Markup Language (XML), as well as image formats such as Graphics Interchange Format (GIF) and Joint Photographic Experts Group (JPEG).

A Web site is conventionally a related collection of Web files that includes a beginning file called a "home" page. From the home page, a visitor can access other files and applications at a Web site. A large Web site may utilize a number of servers, which may or may not be different and which may or may not be geographically-dispersed. For example, the Web site of the International Business Machines Corporation (www.ibm.com) includes thousands of Web pages and files spread out over multiple Web servers in locations world-wide.

A Web server (also referred to as an HTTP server) is a computer program that generally utilizes HTTP to serve files that form Web pages to requesting Web clients. Exemplary Web servers include International Business Machines Corporation's family of Lotus Domino® servers, the Apache server (available from www.apache.org), and Microsoft's Internet Information Server (IIS), available from Microsoft Corporation, Redmond, Wash. A Web client is a requesting program that also generally utilizes HTTP. A browser is an exemplary Web client for use in requesting Web pages and files from Web servers. A Web server waits for a Web client, such as a browser, to open a connection and to request a specific Web page or application. The Web server then sends a copy of the requested item to the Web client, closes the connection with the Web client, and waits for the next connection.

HTTP allows a browser to request a specific item, which a Web server then returns and the browser renders. To ensure that browsers and Web servers can interoperate unambiguously, HTTP defines the exact format of requests (HTTP requests) sent from a browser to a Web server as well as the format of responses (HTTP responses) that a Web server returns to a browser. Exemplary browsers that can be utilized with the present invention include, but are not limited to, Netscape Navigator® (America Online, Inc., Dulles, Va.) and Internet Explorer® (Microsoft Corporation, Redmond, Wash.). Browsers typically provide a graphical user interface for retrieving and viewing Web pages, applications, and other resources served by Web servers.

As is known to those skilled in this art, a Web page is conventionally formatted via a standard page description language such as HTML, which typically contains text and can reference graphics, sound, animation, and video data. HTML provides for basic document formatting and allows a Web content provider to specify anchors or hypertext links (typically manifested as highlighted text) to other servers. When a user selects a particular hypertext link, a browser running on the user's client device reads and interprets an address, called a Uniform Resource Locator (URL) associated with the link, connects the browser with a Web server at that address, and makes a request (e.g., an HTTP request) for the file identified in the link. The Web server then sends the requested file to the client device which the browser interprets and renders within a display screen.

As also will be appreciated by one of skill in the art, the present invention may be embodied as methods, data processing systems, and/or computer program products. Accordingly, the present invention may take the form of an entirely hardware embodiment, an entirely software embodiment running on general purpose hardware, an embodiment combining software and hardware aspects, an entirely manual embodiment without using software, or an embodiment combining software, hardware, and manual aspects. Furthermore, the present invention may take the form of a computer program product on a computer-usable storage medium having computer-usable program code embodied in the medium. Any suitable computer readable medium may be utilized including hard disks, CD-ROMs, optical storage devices, or magnetic storage devices.

Computer program code for carrying out operations of the present invention may be written in an object oriented programming language such as JAVA®, Smalltalk or C++. The computer program code for carrying out operations of the present invention may also be written in conventional procedural programming languages, such as "C", JavaScript, Visual Basic, TSQL, Perl, or in a functional (or fourth generation) programming language such as Lisp, SML, or Forth. In addition, Microsoft Active Server Pages (ASP) technology and Java Server Pages (JSP) technology may be utilized. The program code may execute entirely on one or more Web servers and/or application servers, or it may execute partly on one or more Web servers and/or application servers and partly on a remote computer (i.e., a user's Web client), or as a proxy server at an intermediate point in the network. In the latter scenario, the remote computer may be connected to the Web server through a LAN or a WAN (e.g., an intranet), or the connection may be made through the Internet (e.g., via an Internet Service Provider).

The present invention is described below with reference to block diagram and flowchart illustrations of methods, apparatus (systems) and computer program products according to an embodiment of the invention. It will be understood that each block of the block diagrams and/or flowchart illustrations, and combinations of blocks, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create structures for implementing the functions specified in the block diagram and/or flowchart block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function specified in the block diagram and/or flowchart block or blocks.

The computer program instructions may also be loaded onto a computer or other programmable data processing apparatus to cause a series of operational steps to be performed on the computer or other programmable apparatus to produce a computer implemented process or method such that the instructions which execute on the computer or other programmable apparatus provide steps for implementing the functions specified in the block diagram and/or flowchart block or blocks.

Figure 1:
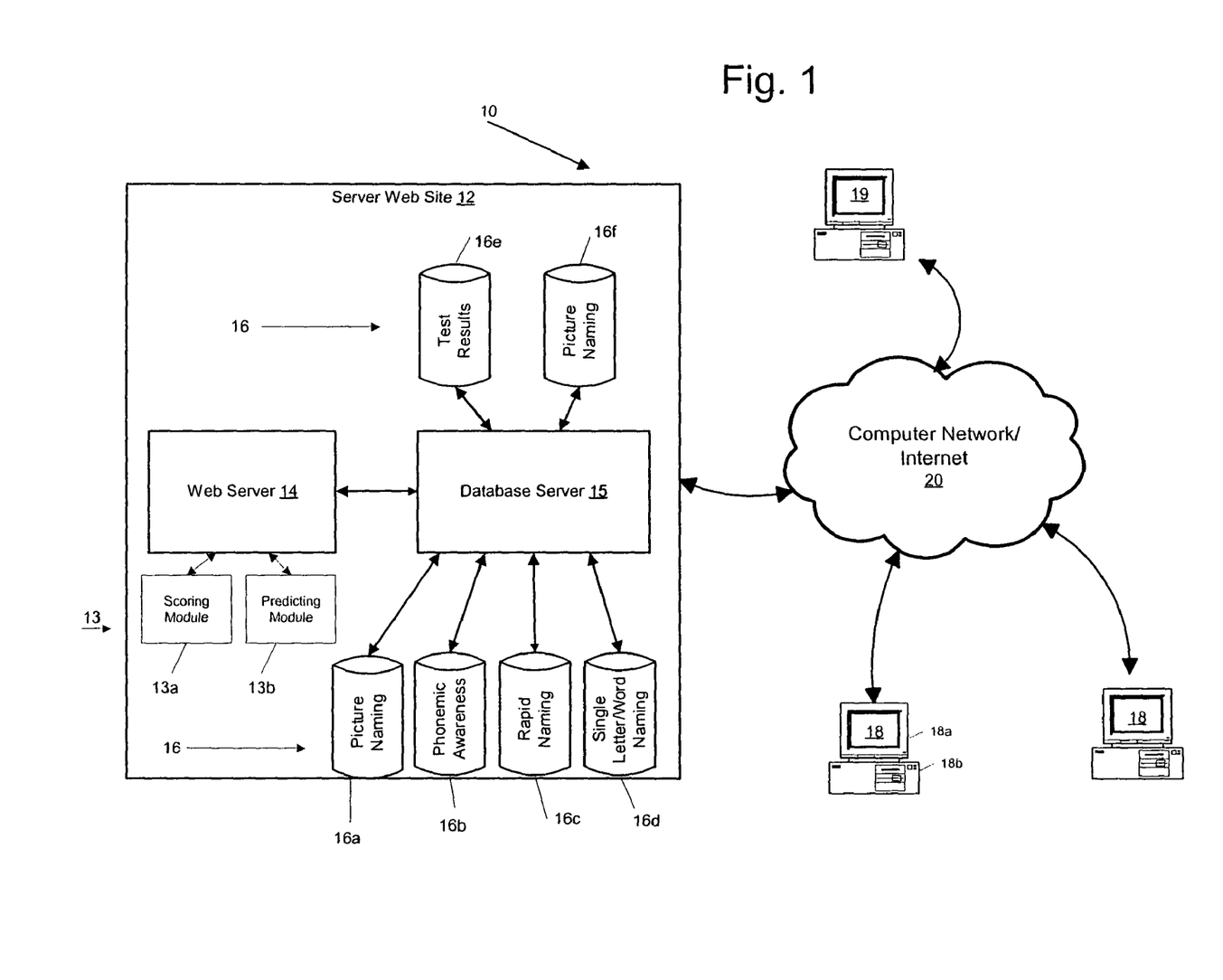
FIG. 1 is a exemplary system diagram of embodiments of the current invention.

Referring now to FIG. 1, a computer system 10 that can practice methods and/or include computer program products for testing and/or assessing future reading ability, according to an embodiment of the present invention, is schematically illustrated. The illustrated system 10 includes a server Web site 12 and a plurality of clients 18 and an administrator 19 that may communicate with one another over a computer network, such as the Internet 20. Each client 18 includes a computer display 18a and a computer 18b. Data entry mechanism may also be included. Examples of data entry mechanism include keyboards, touch sensitive screens, voice activated sensors, or pointing devices such as a mouse.

The server Web site 12 includes a Web server 14, such as a Java Web server, a database server 15 and one or more databases 16. As shown in FIG. 1, the databases 16 may include a picture vocabulary testing database 16a, a phonemic awareness testing database 16b, a rapid naming testing database 16c, a single letter or word naming testing database 16d a test results database 16e, and a factor database 16f. Other databases also may be provided. Although a single Web server 14 and database server 15 are illustrated, it will be understood that multiple Web servers and multiple database servers (including other application servers) may be utilized according to the present invention.

The Web server 14 is the "front end" component of the Web site 12, and is configured to handle requests from various clients 18 that access the Web site 12. The clients 18 may be teachers, educators, or students. The Web server 14 can include program code, logic and graphics, to interface with the clients 18. The program code may include various program modules 13 such as the scoring module 13a for scoring test results and the predicting module 13b for generating a prediction of future reading ability. Exemplary commercial Web servers that may be utilized as a Web server 14 in the illustrated system 10 are Apache, available from the Apache Server Project, http://www.apache.org; Microsoft's Internet Information Server (IIS), available from Microsoft Corporation, Redmond, Wash.; and Netscape's FastTrack® and Enterprise™ servers, available from America Online, Inc., Dulles, Va. Other Web servers that may be utilized include Novell's Web Server for users of its NetWare® operating system, available from Novell, Inc., San Jose, Calif.; and IBM's family of Lotus Domino® servers, available from International Business Machines Corporation, Armonk, N.Y.

As is known by those of skill in the art, a database is a collection of data that is organized in tables or other conventional forms of organization. A database typically includes a database manager and/or database server 15 that facilitates accessing, managing, and updating data within the various tables of a database. Exemplary databases that can be used to implement the present invention include a picture vocabulary testing database 16a, a phonemic awareness testing database 16b, a rapid naming testing database 16c, a single letter or word naming testing database 16d a test results database 16e, and a factor database 16f. Exemplary types of databases that can be used include relational databases, distributed databases (databases that are dispersed or replicated among different points in a network), and object-oriented databases. Relational, distributed, and object-oriented databases are well understood by those of skill in the art and need not be discussed further herein. Since the present invention preferably includes large quantities of stored patterns, a database system that is particularly adapted for storing and searching large numbers of patterns, such as Oracle8i Visual Image Retrieval (VIR) available from Oracle Corp., Redwood Shores, Calif. may be used. See the Oracle8i Visual Information Retrieval Data Sheet, March 1999. However, other databases may be used, including IBM's DB2® database, Microsoft's SQL server database, and database products from Sybase and Computer Associates.

The database server 15 is an application server that operates as a "middleman" server between the Web server 14 and the plurality of databases 16. The database server 15 generally includes program code and logic for retrieving data from the databases 16 (and from sources external to the Web site 12) in response to requests from the Web server 14. The database server preferably is adapted for searching and storing of large numbers of patterns, such as Oracle VIR. Other commercial database servers that may be utilized as a database server 14 in the illustrated system 10 include Microsoft's SQL server, IBM DB2® Universal Database server, and the WebSphere™ Net.Commerce server, the latter two being available from International Business Machines Corporation, Armonk, N.Y.

FIG. 1 illustrates a plurality of databases including picture vocabulary testing database 16a, a phonemic awareness testing database 16b, a rapid naming testing database 16c, a single letter or word naming testing database 16d, a test results database 16e, and a factor database 16f. However, it will be understood that one or more of these databases may be combined into a single database and that other databases also may be provided at the server Web site 12. The databases 16a, 16b, 16c, 16d may store a plurality of testing materials and testing questions for picture vocabulary skills, phonemic awareness, rapid naming, and single letter or word naming, respectively. Detailed examples of the tests are provided herein. In addition, a test results database 16e may be provided for storing the results of tests given to individuals. A factor database 16f may also be provided for gathering various types of factors about the individuals tested. Examples of factors include remedial reading instruction and epidemiological factors. The testing materials for the databases 16a, 16b, 16c, 16d, 16e, 16f may be stored, organized and/or manipulated using conventional cataloging software, such as Extensis PhotoTools 3.0, marketed by the Extensis Products Group of Creativepro.com, Inc. See www.extensis.com. Other software such as Thumbs Up™ marketed by Graphic Detail, Inc. may be used. See www.graphicdetail.com. Data mining techniques and studies using clinical data analysis techniques may also be performed.

The server Web site 12 is accessible to client terminals 18 via a computer network such as the Internet 20. Clients at client terminals 18 can access the server Web site 12 via a client program, such as a browser, running on a client device, such as a personal computer 18b including a display 18a. However, it is understood that electronic devices such as personal digital assistants (PDAs), hand-held computers, Internet-ready phones, and WebTVs, may be utilized as client devices for accessing the Web site 12 in accordance with the present invention.

The Web server 14 also is configured to communicate with various third parties in order to carry out aspects of the present invention. For example, the Web server 14 may be configured to communicate with the administrator 19, in order to obtain and update various testing materials and questions for the picture vocabulary testing database 16a, the phonemic awareness testing database 16b, the rapid naming testing database 16c, and the single letter or word naming testing database 16d. The administrator 19 may communicate with the client terminals 18, for example, by sending an email or posting a message via the Internet and preferably through the Web server 14. The communications between the administrator 19 and the client terminals 18 may include instructions for administering tests, instructions for scoring tests, and other information that may be useful to teachers and educators. Communications between the administrators 19, client terminals 18, and server Web site 12 are preferably established via the Internet 20. However, other communication methods and networks may be utilized, including direct-dial access and telephonic communications. Wireless or wire communications may be used.

In certain embodiments of the invention, teachers or educators enter measurements of a particular student's aptitude in the following four areas: picture vocabulary, phonemic awareness, rapid naming, and single letter/word reading. An educator or technician at client terminal 18 may enter the four measurements through the Internet 20 at the server Web site 12. The Web server 14 may score the measurements using the scoring module 13a. As used herein, the term "score" refers to a measurement of the result of a test. "Scoring" may include mathematical manipulations such as normalization and other conventional methods for converting raw score (i.e., the number of correct answers) to a standardized score. Converting a raw score to a standardized score is commonly referred to as standardization. For example, a standard Intelligence Quotient (I.Q.) test is scored and standardized such that a population mean of 100 and standard deviation of 15 results. Various tests conform to the I.Q. test standardization and are standardized for a population mean of 100 and a standard deviation of 15. Alternatively, individual tests may be standardized to a mean of 10 and a standard deviation of 3.

In some embodiments, the measurements of the four aptitudes entered by the educator or technician are scores from previously administered tests, for example, tests that have been administered and scored by an educator or technician. The scoring of the tests may be performed manually or using a separate system and entered into the computer system 10. The scores may or may not require additional manipulations such as standardization, which may be performed by the scoring module 13a. In other embodiments, the measurements may include raw data such as answers to specific questions. An educator may present the questions to the subject and score or record the answers manually. An educator or technician may then enter the answers in the computer system 10. In addition, the individual being tested may be presented with questions and enter the answers at client terminals 18. The raw data may also be entered by electronic scanning of answer sheets. The raw data may be scored by the scoring module 13a according to an answer key and/or scoring or standardization algorithm for each specific test.

In certain embodiments, the databases 16a, 16b, 16c, 16d include tests for picture naming, phonemic awareness, rapid naming, and single letter or word naming, respectively. The database server 15 may select a group of tests from the four databases 16a, 16b, 16c, 16d. Test questions may then be posted to the server Web site 12 or transferred to the client terminals 18 for viewing by an individual situated at a client terminal 18. The test questions may include text, audio, or visual components. The individual being tested may enter answers to the questions at the client terminal using standard conventional data entry mechanisms such as keyboards, touch sensitive screens, voice activation, or pointing mechanisms such as a mouse. The scores may be stored in the test results database 16e, which may be used to generate aggregate reports of test results and analysis of test results. For example, an aggregate report may compare a student or group of students with a peer group of subjects.

Figure 2:
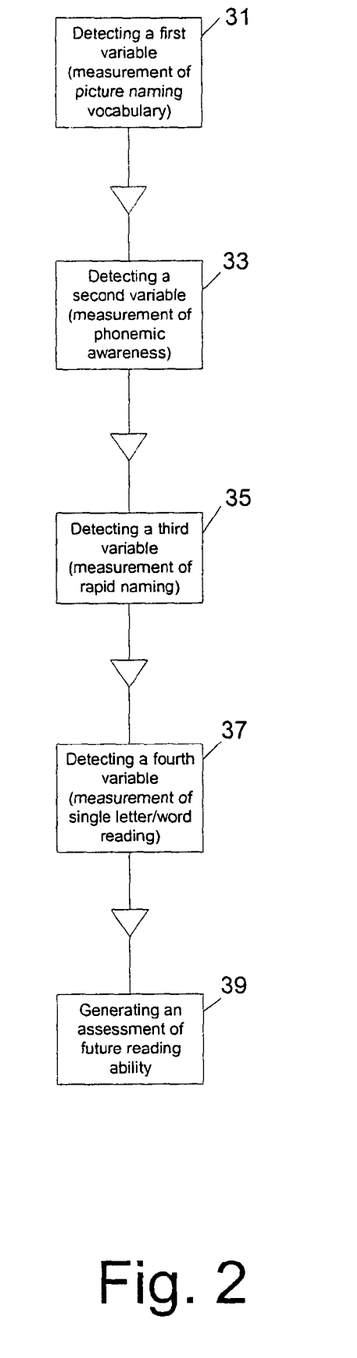
FIG. 2 is a flow chart of embodiments of the invention.
Figure 3:
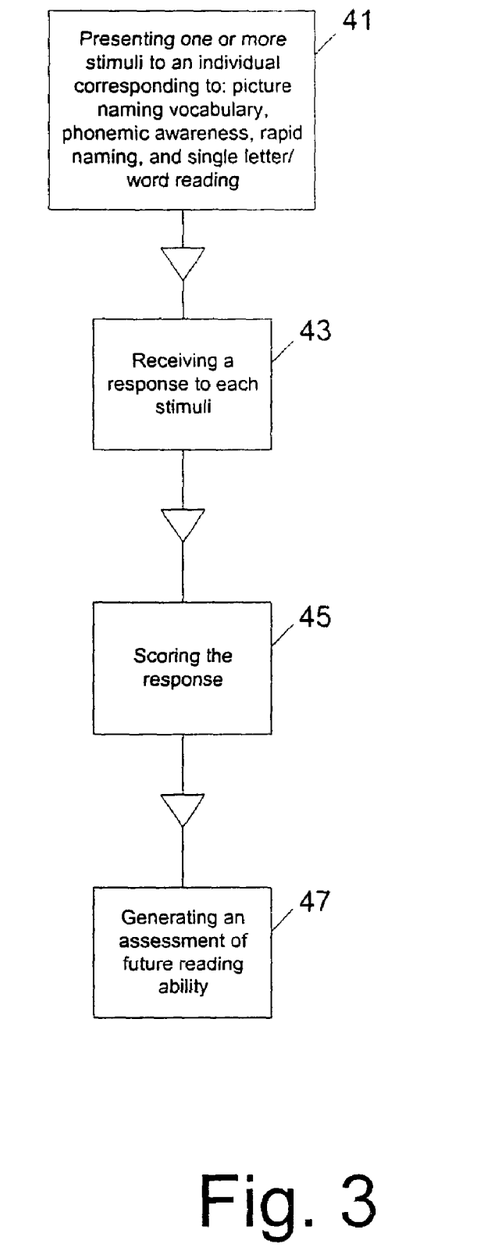
FIG. 3 is a flow chart of embodiments of the invention.
Figure 4:
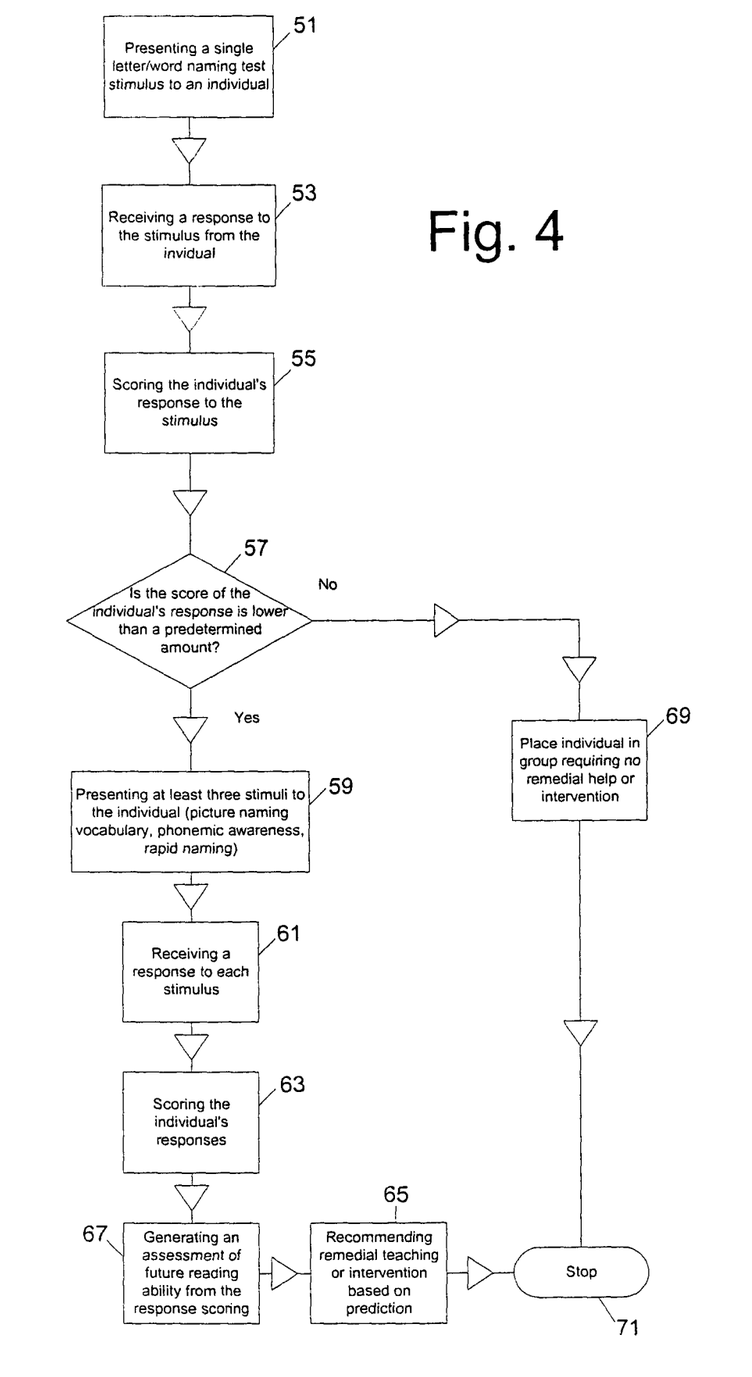
FIG. 4 is a flow chart of embodiments of the invention.

Flowchart FIGS. 2-4

Turning now to FIG. 2, a flow chart depicting an embodiment according to the invention is shown. The embodiment depicted in FIG. 2 includes detecting four variables that correspond to measurements of picture naming vocabulary, phonemic awareness, rapid naming, and single letter/word reading. The Web server 14 may detect the measurements as an entry from a client terminal 18. The entry may be scored results of a previously administered test or answers to a previously administered test that can be scored by the scoring module 13a. The entry may also be responses to a test administered through Web site 12 that may be received and scored by the scoring module 13a.

At Block 31, a measurement of picture vocabulary is detected as a first variable. A second variable representing a measurement of phonemic awareness is detected at Block 33. A third variable is detected at Block 35 and represents a measurement of rapid naming skills. A fourth variable representing a measurement of single letter or word reading is detected at Block 37. At block 39, an assessment of future reading ability is generated, preferably by the predicting module 13b.

In certain embodiments, all of the detecting steps may be performed in less than about thirty minutes. In some embodiments, all of the detecting steps may be performed in less than about twenty minutes.

Referring to FIG. 3, embodiments according to the invention are shown. At Block 41, one or more stimuli are presented to an individual, preferably by Web server 14 using testing materials from databases 16a, 16b, 16c, 16d and displayed at client terminal 18 (FIG. 1). The stimuli may correspond to tests for measuring picture vocabulary, phonemic awareness, rapid naming, and single letter or word reading. The response to each stimuli is received at Block 43, preferably by communications from the client terminal 18 to the server Web site 12 (FIG. 1). The response is scored at Block 45, preferably by the scoring module 13a (FIG. 1). Next, an assessment of future reading ability is generated at Block 47, preferably by the predicting module 13b (FIG. 1).

Embodiments of methods according to the invention are shown in FIG. 4. FIG. 4 depicts the flow of a method for identifying individuals at risk for developing reading difficulties. The methods involve administering a first test to identify individuals at risk for developing reading difficulties. A single letter or word naming test may be used as the first test because it is more accurate in predicting future reading assessment when considered alone than the picture naming vocabulary, phonemic awareness, or rapid naming tests alone. The students who score below a predetermined amount are given further tests to obtain a better assessment of their future reading scores. Students who score above the predetermined amount may not need to be given further tests. In some embodiments, the predetermined amount is below about the fiftieth percentile. In other embodiments, the predetermined amount is below about the thirty-fifth percentile.

At Block 51, one or more stimuli associated with a single letter or word naming test is presented to the individual, for example, at the client terminal 18 (FIG. 1). A response to the stimulus is received at Block 53. The response may be received by the Web server 14 (FIG. 1) or by a test administrator. The individual's response is scored at Block 55 by the scoring module 13*a* (FIG. 1) or by a test administrator. If the score of the individual's response to the one or more stimuli is lower than a predetermined amount at Block 57, the individual is given additional tests at Block 59. The tests include stimuli associated with a picture vocabulary test, a phonemic awareness test, and a rapid naming test. A response is received to each stimulus at Block 61. The individual's responses are scored at Block 63, for example, by the scoring module 13*a* or by a test administrator. An assessment of future reading ability is generated at Block 67, preferably by the predicting module 13*b*. Methods may also include recommending remedial teaching or intervention at Block 65. Referring back to Block 57, if the score of the individual's response is not lower than a predetermined amount, the individual is placed in a group of students that require no remedial help or intervention at Block 69, and the methods stop at Block 71. The steps depicted in FIG. 4 may be repeated for a group of individuals such that the end result is a group of students requiring no remedial help or intervention (Block 69) and a group of students associated with an assessment of their future reading ability (Block 67) and a recommendation of remedial teaching or intervention (Block 65).

In certain embodiments, the presenting and receiving steps may be performed in less than about thirty minutes. In other embodiments, the presenting and receiving steps may be performed in less than about twenty minutes.

Detailed embodiments of the generation of the assessment of future reading ability are provided herein.

Testing Methods

Various methods for testing picture naming vocabulary, phonemic awareness, rapid naming, and single letter or word naming are available. The following tests are examples of tests currently available for testing specific abilities. As would be understood by those of ordinary skill in the art, other tests currently available or developed in the future for measuring picture naming vocabulary, phonemic awareness, rapid naming, and single letter or word naming may be used. In addition, the following tests may be modified from commercially available tests, for example, by using different pictures, letters or words, to test essentially the same skills. The tests may be administered in their entirety or selected portions of a test may be administered. For example, odd or even numbered test questions may be selected in order to shorten the test. Each test described below is understood to encompass such variations on commercially available tests.

The *Boston Naming Test (BNT)* is a test for measuring picture vocabulary. (Kaplan, E., Goodglass, H., & Weintraub, S. (1982). *Boston naming test*, Philadelphia: Lea & Flebiger.) This test simply requires the subject to name the single picture depicted in a line drawing. Originally developed for use in testing for the naming difficulty that defines the anomic symptom complex within aphasia, the test offers pictorial items ranging from very common, suitable for kindergarteners, to the relatively infrequent, suitable for adults. Simple un-cued accuracy of word naming, un-timed, is scored.

The *Peabody Picture Vocabulary Test-Revised (PPVT-R)* also measures picture naming vocabulary. (Dunn, L. M., & Dunn, L. M., (1981). *Peabody Picture Vocabulary Test-Revised*. Circle Pines, Minn.: American Guidance Service.) This test presents sets of four simple line drawings and asks the subject to point to the one that matches the word spoken by the examiner. Like the BNT, it is un-timed and its items span a difficulty range from late preschool years to adulthood. A standard score is generated based on un-timed accuracy. The standardization of the score is the same as an I.Q. standardization: the score has a population mean of 100 and standard deviation of 15.

The *Rapid Automatized Naming (RAN)* test measures rapid naming. (Denckla and Rudel (1976). *Naming of object drawings by dyslexic and other learning disabled children*, Brain and Language, 3, 1-16.) The tests present four cards of fifty items each (digits, letters, color squares, and simple line drawings of objects, presented in five rows of ten items each). The subject's task is to name the items on a card as rapidly as possible; the score for each card is the number of seconds required to do so. For analysis, the digit and letter scores were added to generate a single digit-letter (NUMLET) score; the color and object naming scores were added to generate a single color-object (COLOB) score. The natural logarithm of these summed composite raw time scores may then be taken as the dependent measure, since the distribution of the raw time scores has an expected strongly positive skew. The Rapid Automatized Naming test may be modified such that the stimuli are arranged in such a way that each of the five repeated items follows and precedes each other item the same number of times in the fifty item series. One version of the test includes colors and objects for rapid naming and may be used for early to middle-year kindergarten age children. Another version of the test uses letters and numbers and may be used for late-year kindergarten through the third grade.

The *Rapid Alternating Stimulus* (Wolf, M. (1984) *Naming, reading, and the dyslexias: A longitudinal overview*. Annals of Dyslexia, 34, 87-115.) also measures rapid naming ability. Subjects are required to name, as rapidly as possible, items presented visually on a chart in a format similar to the RAN tests. As in the RAN, the score is the number of seconds required to complete the naming of items on the card. The two-category Rapid Alternating Stimulus task consists of five letters and five numbers, repeated in a fixed A-B-A-B pattern. The three-category task consists of five letters, five numbers, and five colors, repeated in a fixed A-B-C-A-B-C pattern. Both tasks may be summed to form a single composite score, which may be log transformed as described above for the RAN tests.

The *Phonemic Analysis Composite (PAC)* measures phonemic awareness. (Stanovich, K. E., Cunningham, A. E., & Cramer, B. B. (1984). *Assessing phonological awareness in kindergarten children: Issues of task comparability*. Journal of Experimental Child Psychology, 38, 175-190.) The "Strip Initial Consonant" component requires the subject to delete the initial phoneme of a word spoken by the examiner, pronouncing the word that remains. The "Final Consonant Different" task requires the subject to listen to four words and choose the one that has a different ending sound. As the two tests each have only ten items, the scores from both tests were added to generate a single, 20 item, Phonemic Analysis Composite (PAC) score.

The *Test of Auditory Analysis Skills* (*TAAS*) also measures phonemic awareness. (Rosner, J. (1979). *Helping children overcome learning difficulties* (2nd Ed). New York: Walker and Company.) This is a simple 13 item test of phoneme segmentation and deletion.

The *Lindamood Auditory Conceptualization Test* (*LAC*) measures single letter reading skills. (Lindamood, C. R., & Lindamood, P. C. (1971). *Lindamood auditory conceptualization tests*. Boston: Teaching Resources Corporation.) The test requires the subject to manipulate wooden blocks of different colors to indicate speech sound patterns in two categories: isolated sounds in sequence, and sounds within a syllable. Un-timed accuracy is the primary score.

The *Decoding Skills Test Real Word subtest* (*DST-WORD*) (Richardson & DiBenedetto, (1985). *The decoding skills test*, Parkton, Md.; York Press.) measures single word reading skills. The DST was originally constructed as a research tool for use in studies of dyslexia. Single word reading skills may be measured by using only a sixty item single real word test (DST-WORD) in Part II of the test, in its commercially available form. Half of the items in Part II are monosyllabic, and the other half are polysyllabic. The test is criterion referenced to a fifth grade level ceiling, and is intended for use throughout grades 1 through 5.

The *Woodcock-Johnson Letter Word Identification* (*LWI*) subtest from the Woodcock-Johnson Psychoeducational battery is also a test that measures single word reading ability. It is norm referenced and has a difficulty span from ending kindergarten through adulthood.

Each of the above tests is an example of a method for testing a particular skill, i.e., picture vocabulary, phonemic awareness, rapid naming, and single letter or word naming. As would be understood by one of skill in the art, additional tests for measuring such skills may be substituted for the tests disclosed herein. Such tests may be created based on the skill tested. In addition, the tests may be modified from the standard or commercially available forms. Modifications to the tests include substituting test questions or the words, pictures, colors and the like used in the questions. The modifications may be made with attention to item difficulty and cultural fairness. For example, when administering the tests to kindergarten to third grade, the tests may be modified to optimize the test item difficulty to span kindergarten to third grade.

Generation of the Assessment of Future Reading Ability

The generation of the assessment of future reading ability may be carried out with an empirically-based model of actual clinical experience and/or with a regression model. In certain embodiments, the assessment of concurrent reading ability is accurate. In some embodiments, the assessment of future reading ability is accurate for at least about three years. In other embodiments, the prediction of future reading ability is accurate for at least about seven years. In still other embodiments, the prediction of future reading ability is accurate for at least about ten years. By the term "accurate" it is meant that the predictive assessment of current or future reading scores is accurate to within about fifteen standard score points for 95% of the subjects tested, or seven and a half standard score points for 68% of the subjects tested, or a validity coefficient of 0.80 or better. In some embodiments, the prediction of concurrent reading ability has a validity coefficient of about 0.93. In some embodiments, the prediction of future reading ability has validity coefficients ranging from about 0.83 to about 0.87. The individual being tested may be a juvenile, for example, a child between about five (kindergarten) and about nine (fourth grade). The individual may also be an adolescent, for example, a child between about ten (fifth grade) and about thirteen (eighth grade).

Weighting coefficients may be assigned to the first, second, third, and fourth variables. In other words, the assessment of future reading ability may be generated using the following equation:

$$\text{FutureAssessmentScore} = y + C_{PNV}PNV + C_{PA}PA + C_{RN}RN + C_{SLW}SLW \quad \text{Equation 1}$$

where y is the intercept $C_{PNV}$ is the weighting coefficient of picture vocabulary PNV is the standardized score of the picture naming vocabulary test $C_{PA}$ is the weighting coefficient of phonemic awareness PA is the standardized score of phonemic awareness $C_{RN}$ is the weighting coefficient of rapid naming RN is the standardized score of rapid naming $C_{SLW}$ is the weighting coefficient of the single letter or word naming test SLW is the standardized score of the single letter or word naming test The weighting coefficients are proportional to the degree to which each variable describes a unique aspect of present or future reading ability of an individual. Unique means that the aspect is unique when considered in the context of the degree to which each of the other variables also describes a different unique aspect of present or future reading ability. In certain embodiments, the weighting coefficient assigned to the fourth variable (representing a measurement of single letter or word reading) is assigned a weighting coefficient that is greater than the weighting coefficients assigned to each of the first, second, and third variables. The fourth coefficient may be greater than the first, second and third variables by a factor of about two. Such weighting coefficients may be used to predict the Woodcock-Johnson reading test. In some embodiments, the weighting coefficient assigned to the first variable may be greater than the weighting coefficients associated with each of the second, third, and fourth variables. Such weighting coefficients may be used to predict the Gates-MacGinitie reading test.

The invention will now be described with respect to the following illustrative examples. It should be understood that the examples are for the purposes of illustration, and in no way limit the invention that is described by the claims.

EXAMPLE 1

In one illustrative example according to the present invention, the measurement of picture vocabulary includes a Boston Naming Test, the measurement of phonemic awareness includes a Phonemic Analysis Composite test, the measurement of rapid naming includes a Rapid Automatized Naming Test (letter-number subtest), and the measurement of single letter or word naming includes a Decoding Skills Test-Real Word Subtest. The scores of the tests may be standardized to conform to the I.Q. score standard, i.e., a 100 mean score with a standard deviation of 15. The tests are administered in first grade.

In Example 1, Equation 1 is used to generate an assessment of concurrent or future reading ability according to the following numeric values for using test results from first grade to predict a Woodcock-Johnson test score in first, third, and eighth grades:

$$\text{FutureAssessmentScore} = y + C_{PNV}PNV + C_{PA}PA + C_{RN}RN + C_{SLW}SLW$$

where y is 4.160 (first grade); 2.770 (third grade); 2.880 (eighth grade)

$C_{PNV}$ is 0.160 (first grade); 0.210 (third grade); 0.240 (eighth grade)

$C_{PA}$ is 0.210 (first grade); 0.170 (third grade); 0.130 (eighth grade)

$C_{RN}$ is 0.160 (first grade); 0.130 (third grade); 0.160 (eighth grade)

$C_{SLW}$ is 0.520 (first grade); 0.520 (third grade); 0.450 (eighth grade)

The same tests may be used to predict the scores of the Gates-MacGinitie reading test in eighth grade, using the following coefficients:

where y is −7.550
$C_{PNV}$ is 0.450
$C_{PA}$ is 0.210
$C_{RN}$ is 0.190
$C_{SLW}$ is 0.220

EXAMPLE 2

In one illustrative example according to the present invention, the measurement of picture vocabulary includes a Peabody Picture Vocabulary test-Revised, the measurement of phonemic awareness includes a Lindamood Auditory Conceptualization test, the measurement of rapid naming includes a Rapid Automatized Naming—Single Color-Object test, and the measurement of single letter or word naming includes a Woodcock Johnson—Letter-Word Identification Test, 1977 version. The scores of the tests may be standardized to conform to the I.Q. score standard, i.e., a 100 mean score with a standard deviation of 15. The tests are administered in first grade.

In Example 2, Equation 1 is used to generate an assessment of concurrent or future reading ability according to the following numeric values for using test results from first grade to predict a Woodcock-Johnson test score in first, third, and eighth grades:

$$FutureAssessmentScore = y + C_{PNV}PNV + C_{PA}PA + C_{RN}RN + C_{SLW}SLW$$

where y is 15.430 (first grade); 7.890 (third grade); 8.42 (eighth grade)

$C_{PNV}$ is 0.080 (first grade); 0.110 (third grade); 0.180 (eighth grade)

$C_{PA}$ is 0.150 (first grade); 0.160 (third grade); 0.140 (eighth grade)

$C_{RN}$ is 0.030 (first grade); 0.080 (third grade); 0.100 (eighth grade)

$C_{SLW}$ is 0.680 (first grade); 0.610 (third grade); 0.520 (eighth grade)

The same tests may be used to predict the scores of the Gates-MacGinitie reading test in eighth grade, using the following coefficients:

where y is −7.120
$C_{PNV}$ is 0.430
$C_{PA}$ is 0.200
$C_{RN}$ is 0.110
$C_{SLW}$ is 0.330

EXAMPLE 3

In an illustrative example according to the invention, the tests in Example 1 and the tests in Example 2 are considered. That is, the measurement of picture vocabulary includes a Boston Naming Test and Peabody Picture Vocabulary test-Revised, the measurement of phonemic awareness includes a Phonemic Analysis Composite test and a Lindamood Auditory Conceptualization test, the measurement of rapid naming includes a Rapid Automatized Naming Test and Rapid Automatized Naming—Single Color-Object test, and the measurement of single letter or word naming includes a Decoding Skills Test-Real Word Subtest and a Woodcock Johnson—LWI. The scores of the tests may be standardized to conform to the I.Q. score standard, i.e., a 100 mean score with a standard deviation of 15. The tests are administered in first grade.

In Example 1, Equation 1 is used to generate an assessment of concurrent or future reading ability according to the following numeric values for using test results from first grade to predict a Woodcock-Johnson test score in first, third, and eighth grades:

$$FutureAssessmentScore = y + C_{PNV}PNV + C_{PA}PA + C_{RN}RN + C_{SLW}SLW$$

where y is 5.020 (first grade); 1.050 (third grade); 0.400 (eighth grade)

$C_{PNV}$ is 0.130 (first grade); 0.180 (third grade); 0.230 (eighth grade)

$C_{PA}$ is 0.270 (first grade); 0.210 (third grade); 0.170 (eighth grade)

$C_{RN}$ is 0.130 (first grade); 0.140 (third grade); 0.160 (eighth grade)

$C_{SLW}$ is 0.520 (first grade); 0.520 (third grade); 0.450 (eighth grade)

The same tests may be used to predict the scores of the Gates-MacGinitie reading test in eighth grade, using the following coefficients:

where y is −13.270
$C_{PNV}$ is 0.490
$C_{PA}$ is 0.230
$C_{RN}$ is 0.140
$C_{SLW}$ is 0.260

EXAMPLE 4

In one illustrative example according to the present invention, the measurement of picture vocabulary includes a Boston Naming Test, the measurement of phonemic awareness includes a Phonemic Analysis Composite test, the measurement of rapid naming includes a letter number subtest of the Rapid Automatized Naming Test, and the measurement of single letter or word naming includes a Decoding Skills Test-Real Word Subtest. The scores of the tests may be standardized to conform to the I.Q. score standard, i.e., a 100 mean score with a standard deviation of 15. The tests are administered in third grade.

In Example 4, Equation 1 is used to generate an assessment of concurrent or future reading ability according to the following numeric values for using test results from third grade to predict a Woodcock-Johnson test score in the third and eighth grades:

$$FutureAssessmentScore = y + C_{PNV}PNV + C_{PA}PA + C_{RN}RN + C_{SLW}SLW$$

where y is 10.128 (third grade); 7.360 (eighth grade)
$C_{PNV}$ is 0.262 (third grade); 0.312 (eighth grade)
$C_{PA}$ is 0.095 (third grade); 0.122 (eighth grade)
$C_{RN}$ is 0.088 grade); 0.116 (eighth grade)
$C_{SLW}$ is 0.523 (third grade); 0.409 (eighth grade)

The same tests may be used to predict the scores of the Gates-MacGinitie reading test in eighth grade, using the following coefficients:

where y is −1.830
$C_{PNV}$ is 0.485
$C_{PA}$ is 0.161
$C_{RN}$ is 0.081
$C_{SLW}$ is 0.296

The coefficients in the examples above may be modified. For example, if the coefficients and intercept is rounded to two significant digits, accurate results may still be obtained.

EXAMPLE 5

In one illustrative example according to the present invention, the measurement of picture vocabulary includes a picture vocabulary test in which the individual is shown various pictures on a card. The card consists of seven columns with five items per column. The individual is scored based on correctly naming the pictures. The measurement of phonemic awareness includes a combination of a Test of Auditory Analysis Skills and Phonemic Analysis Composite test and additional, similarly worded items. The measurement of rapid naming includes a test similar in form to the Rapid Automatized Naming Test, in which the stimuli are arranged in such a way that each of five repeated items follows and precedes each other item the same number of times in a fifty item series. One version of the Rapid Automatized Naming Test for early- to middle-year kindergarten students uses colors and objects. Another version of the Rapid Automatized Naming Test for late-year kindergarten students through the third grade uses letters and numbers. The measurement of single letter or word naming includes test questions similar in form to the Decoding Skills Test-Real Word Subtest and the Woodcock-Johnson LWI test. The tests may span the difficulty range from kindergarten to third grade and may be modified to be culturally fair. The tests may include both "sight" words that contain irregular spellings and phonetically regular words. The tests may also include some academic content words, i.e., words that the students may have been exposed to in school. The scores of the tests may be standardized to conform to the I.Q. score standard, i.e., a 100 mean score with a standard deviation of 15. The tests may be administered in kindergarten through the third grade.

In Example 5, Equation 1 is used to generate an assessment of concurrent reading ability according to the following numeric values for using test results from third grade to predict a concurrent Woodcock-Johnson test score in the third grade:

$$\text{FutureAssessmentScore} = y + C_{PNV}PNV + C_{PA}PA + C_{RN}RN + C_{SLW}SLW$$

where y is −8.712 (third grade);
$C_{PNV}$ is 0.372 (third grade)
$C_{PA}$ is 0.016 (third grade);
$C_{RN}$ is 0.135 (third grade);
$C_{SLW}$ is 0.556 (third grade);

The same tests may be used to predict the scores of the Woodcock-Johnson tests from the test given in second grade to a concurrent Woodcock-Johnson test, using the following coefficients:
where y is −10.683
$C_{PNV}$ is 0.230
$C_{PA}$ is 0.135
$C_{RN}$ is 0.185
$C_{SLW}$ is 0.566

The same tests may be used to predict the scores of a concurrent Woodcock-Johnson tests from the test given in first grade, using the following coefficients:
where y is −7.542
$C_{PNV}$ is 0.189
$C_{PA}$ is 0.164
$C_{RN}$ is 0.173
$C_{SLW}$ is 0.555

The same tests may be used to predict the scores of the Woodcock-Johnson tests from the test given in kindergarten to a concurrent Woodcock-Johnson test, using the following coefficients:
where y is −5.890
$C_{PNV}$ is 0.123
$C_{PA}$ is 0.046
$C_{RN}$ is 0.397
$C_{SLW}$ is 0.514

The coefficients in the examples above may be modified. For example, if the coefficients and intercept is rounded to two significant digits, accurate results may still be obtained.

Figure 5:
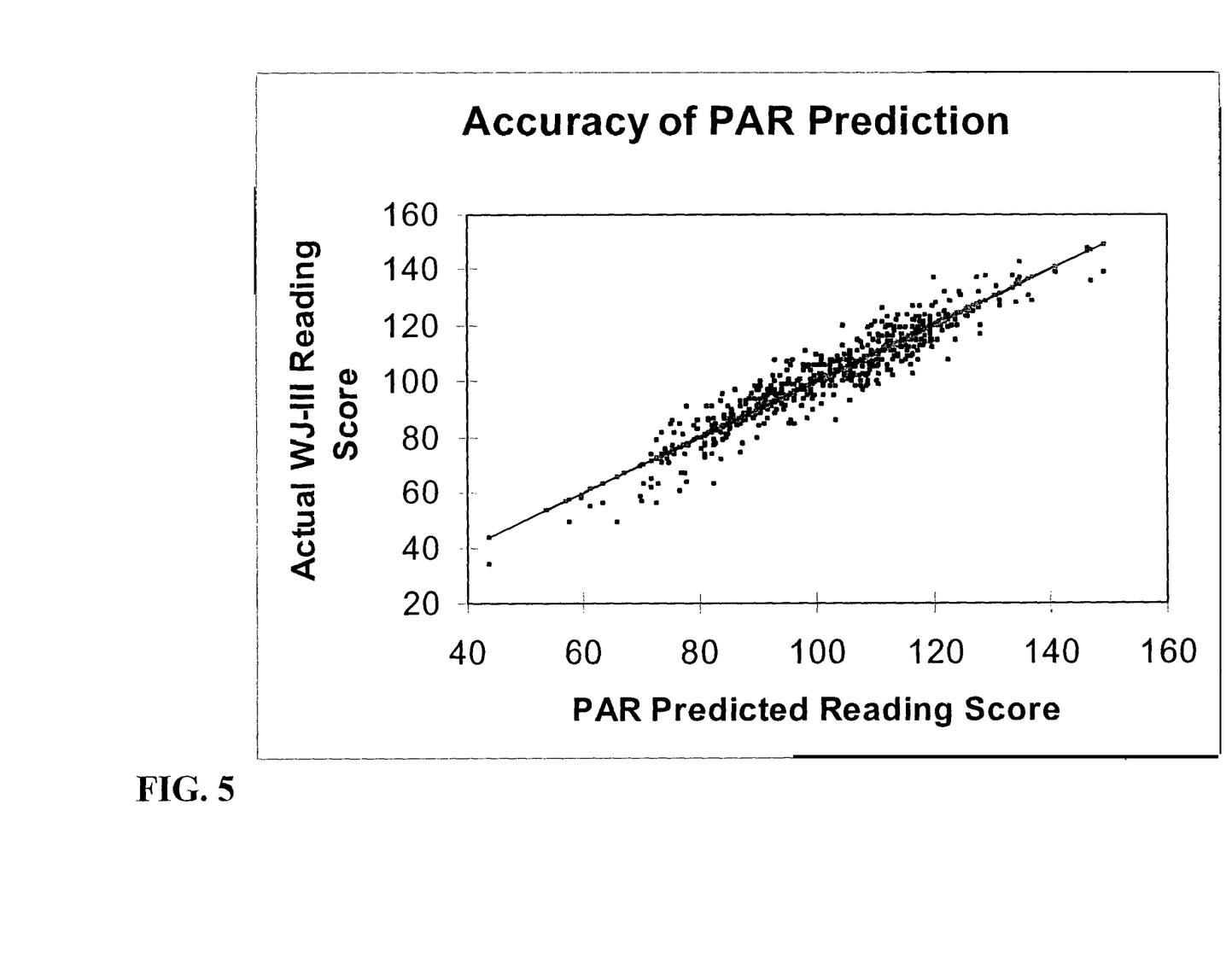
FIG. 5 is a graph of clinical results according to embodiments of the invention.

FIG. 5 is an illustration of actual test data using the tests and coefficients described in Example 5. The actual concurrent Woodcock Johnson III Broad Reading Scores from a multi-ethnic group of 619 subjects, geographically distributed in the United States, are plotted on the vertical y-axis, and the reading scores predicted from the above equation using measurements of picture vocabulary, phonemic awareness, rapid naming, and single letter or word naming, are plotted on the horizontal x-axis as a "predicted reading score." The multiple regression coefficient depicted in FIG. 5 is R=0.94. For predicting the fifteenth percentile, or below, on the Woodcock Johnson III Broad Reading score, the sensitivity is 94.5%, the specificity is 91.3%, the false negative rate is 1.8%, and false alarm rate is 22.9%. If a twenty-fifth percentile threshold is being predicted, with an error tolerance of 10 percentile points positive or negative, then the false negative rate is 2.9% and the false alarm rate is 1.0%. Sensitivity refers to the percentage of actual Woodcock-Johnson III scores below the fifteenth percentile that were correctly predicted by the predictive assessment of reading skills. Specificity refers to the percentage of Woodcock-Johnson III scores above the fifteenth percentile that were correctly predicted. False negative rate refers to the percentage of predictions for Woodcock-Johnson III scores to be above the fifteenth percentile that were incorrect (because the actual Woodcock-Johnson III score was actually below the fifteenth percentile). False alarm rate refers to the percentage of predictions for Woodcock-Johnson III scores to be below the fifteenth percentile that were incorrect (because the actual Woodcock-Johnson III score was actually above the fifteenth percentile).

EXAMPLE 6

In one illustrative example according to embodiment of the present invention, remedial instruction recommendations are based on the specific scores or combinations of scores for the individual tests: picture vocabulary, phonemic awareness, rapid naming, and single letter or word naming. A "cut score" can be assigned as a cut-off point below which a certain course of remedial instruction is recommended. The cut score may be set at any level, but is typically between about the tenth to about the twenty-fifth percentile.

If both phonemic awareness and rapid naming fluency are below a cut score, such as the twenty-fifth percentile, then the recommendation may be for at least some degree of individualized remedial attention that could include both systematic explicit direct code instruction and fluency training. This recommendation may be independent of the other two test scores for picture vocabulary and single letter or word naming. If, in addition, the single letter or word naming score is particularly low, for example, below the tenth or the twenty-fifth percentile, then the recommendation may specify a relatively high degree of individualized attention, with consideration of special education placement.

If a phonemic awareness score is below the cut score, but rapid naming fluency is above the cut score, then the recommendation may be for a degree of phonemic awareness and phonological decoding instruction that can be partly individualized, but may be managed in a mainstream classroom. On the other hand, if rapid naming fluency is below the cut score, but phonemic awareness is above the cut score, then the recommendation may be for fluency training that can be accomplished within a regular overall classroom routine without significant individualized instruction. These recommendations may be independent of the scores for picture vocabulary and single letter or word naming.

If picture vocabulary is the only score below the cut score, then the recommendation may be for language stimulation and enrichment, which may be accommodated in a regular classroom routine.

The foregoing is illustrative of the present invention, and is not to be construed as limiting thereof. The invention is defined by the following claims, with equivalents of the claims to be included therein.

That which is claimed is:

1. A method for assessing future reading ability in an individual comprising:
    detecting a first variable comprising a measurement of picture vocabulary;
    detecting a second variable comprising a measurement of phonemic awareness;
    detecting a third variable comprising a measurement of rapid naming;
    detecting a fourth variable comprising a measurement of single letter or word naming; and then
    generating, by a computer processor, an assessment of present or future reading ability from said first, second, third and fourth variables, wherein said generating is carried out with a regression model and wherein the measurement of picture vocabulary includes asking the individual to name a pictured object and/or asking the individual to select a picture of a spoken word to match the spoken word;
    wherein said step of generating an assessment of present or future reading ability comprises a formula as follows:

$$\text{Future Assessment Score} = y + C_{PNV}\text{PNV} + C_{PA}\text{PA} + C_{RN}\text{RN} + C_{SLW}\text{SLW}$$

wherein FutureAssessmentScore is said assessment of present or future reading ability for a predefined grade, y is a constant, $C_{PNV}$, $C_{PA}$, $C_{RN}$, and $C_{SLW}$ are coefficients, and PNV is said measurement of picture vocabulary, PA is said measurement of phonemic awareness, RN is said measurement of rapid naming, and SLW is said measurement of single letter or word naming.

2. The method of claim 1, wherein said generating is carried out with an empirically-based model of actual clinical experience.

3. The method of claim 1, wherein said generating further comprises assigning a weighting coefficient to each of the first, second, third and fourth variables.

4. The method of claim 3, wherein the weighting coefficient assigned to the fourth variable is greater than the weighting coefficients assigned to each of the first, second, and third variables.

5. The method of claim 3, wherein the weighting coefficient assigned to the first variable is greater than the weighting coefficients assigned to each of the second, third, and fourth variables.

6. The method of claim 3, wherein the weighting coefficient assigned to the fourth variable is greater than the weighting coefficients assigned to each of the first, second and third variables by a factor of about two.

7. The method of claim 1, wherein the measurement of picture vocabulary comprises one or more of a Boston Naming Test and a Peabody Picture Vocabulary Test.

8. The method of claim 1, wherein the measurement of phonemic awareness comprises one or more of a Phonemic Analysis Composite Test and the Test of Auditory Analysis Skills.

9. The method of claim 1, wherein the measurement of rapid naming comprises a Rapid Automatized Naming Test.

10. The method of claim 1, wherein the measurement of single letter or word naming comprises one or more of a Decoding Skills Test-Real Word Subtest and the Woodcock-Johnson Letter Word Identification Test.

11. The method of claim 1, wherein all of said detecting steps are performed in less than about 30 minutes.

12. The method of claim 1, wherein all of said detecting steps are preformed in less than about 20 minutes.

13. The method of claim 1, further comprising identifying individuals for remedial or preventative instruction.

14. The method of claim 1, further comprising recommending remedial or preventative instruction based on the future reading ability prediction.

15. The method of claim 1, wherein the individual is a juvenile.

16. The method of claim 1, wherein the individual is an adolescent.

17. A method for assessing concurrent or future reading ability in an individual comprising:
    presenting at least four stimuli to an individual, wherein each stimulus is associated with at least one of a plurality of assessment tests, said plurality of assessment tests comprising a first picture vocabulary test, a second phonemic awareness test, a third rapid naming test, and a fourth single letter or word naming test;
    receiving a response from the individual to each stimulus;
    scoring the individual's responses to said first picture vocabulary test, said second phonemic awareness test, said third rapid naming test, and said fourth single letter or word naming test as a first, second, third and fourth score, respectively; and
    generating, by a computer processor, an assessment of concurrent or future reading ability from the scoring of the individual's responses, wherein said generating is carried out with a regression model and wherein the stimulus associated with the first picture vocabulary test comprises a pictured object and the response comprises naming the pictured object and/or the stimulus associated with the first picture vocabulary test comprises a spoken word and the response comprises selecting a picture of the spoken word
    wherein said step of generating an assessment of present or future reading ability comprises a formula as follows:

$$\text{Future Assessment Score} = y + C_{PNV}\text{PNV} + C_{PA}\text{PA} + C_{RN}\text{RN} + C_{SLW}\text{SLW}$$

wherein FutureAssessmentScore is said assessment of present or future reading ability for a predefined grade, y is a constant, $C_{PNV}$, $C_{PA}$, $C_{RN}$, and $C_{SLW}$ are coefficients, and PNV is said measurement of picture vocabulary, PA is said measurement of phonemic awareness, RN is said measurement of rapid naming, and SLW is said measurement of single letter or word naming.

18. The method of claim 17, wherein said generating is carried out with an empirically-based model of actual testing experience.

19. The method of claim 17, wherein said generating further comprises assigning a weighting coefficient to each of the first, second, third and fourth scores.

20. The method of claim 19, wherein the weighting coefficient assigned to the fourth score is greater than the weighting coefficients assigned to each of the first, second, and third scores.

21. The method of claim 19, wherein the weighting coefficient assigned to the first score is greater than the weighting coefficients assigned to each of the second, third, and fourth scores.

22. The method of claim 17, wherein the weighting coefficient assigned to the fourth variable is greater than the weighting coefficients assigned to each of the first, second and third scores by a factor of about two.

23. The method of claim 17, wherein the measurement of picture vocabulary comprises one or more of a Boston Naming Test and a Peabody Picture Vocabulary Test.

24. The method of claim 17, wherein the measurement of phonemic awareness comprises one or more of a Test of Auditory Analysis Skills and a Phonemic Analysis Composite Test.

25. The method of claim 17, wherein the measurement of rapid naming comprises a Rapid Automatized Naming Test.

26. The method of claim 17, wherein the measurement of single letter or word naming comprises one or more of a Woodcock-Johnson Letter Word Identification Test and a Decoding Skills Test-Real Word Subtest.

27. The method of claim 17, wherein both said presenting and receiving steps are performed in less than about 30 minutes.

28. The method of claim 17, wherein both said presenting and receiving steps are preformed in less than about 20 minutes.

29. The method of claim 17, further comprising identifying individuals for remedial or preventive instruction.

30. The method of claim 17, further comprising recommending remedial or preventive instruction based on the future reading ability prediction.

31. The method of claim 17, wherein the individual is a juvenile.

32. The method of claim 17, wherein the individual is an adolescent.

33. A method of testing a group of individuals to identify those with reading difficulties or a possible likelihood of developing reading difficulties, comprising: presenting a stimulus to an individual, wherein the stimulus is associated with a single letter or word naming test;
receiving a response from the individual to the stimulus; scoring the individual's response to the stimulus; and if the score of the individual's response is lower than a predetermined amount, presenting at least three stimuli to the individual, wherein each stimulus is associated with at least one of a picture vocabulary test, a phonemic awareness test, and a rapid naming test; receiving a response from the individual to each stimulus; scoring the individual's responses; and
generating, by a computer processor, an assessment of concurrent or future reading ability from the scoring of the individual's responses, wherein the stimulus associated with the picture vocabulary test comprises a pictured object and the response comprises naming the pictured object and/or the stimulus associated with the picture vocabulary test comprises a spoken word and the response comprises selecting a picture of the spoken word
wherein said step of generating an assessment of concurrent or future reading ability comprises a formula as follows:

Future Assessment Score=$y+C_{PNV}$PNV+$C_{PA}$PA+$C_{RN}$RN+$C_{SLW}$SLW wherein Future Assessment Score is said assessment of concurrent or future reading ability for a predefined grade, y is a constant, $C_{PNV}$, $C_{PA}$, $C_{RN}$, and $C_{SLW}$ are coefficients, and PNV is said measurement of picture vocabulary, PA is said measurement of phonemic awareness, RN is said measurement of rapid naming, and SLW is said measurement of single letter or word naming.

34. A predictive reading assessment system, comprising:
a server computer; and
one or more client computers that may establish a communications session with said server computer, wherein said server computer is configured for detecting a plurality of variables from said client computer, said plurality of variables comprising: a first variable comprising a measurement of picture vocabulary; a second variable comprising a measurement of phonemic awareness; a third variable comprising a measurement of rapid naming; and a fourth variable comprising a measurement of single letter or word naming;
wherein said server computer is further configured for generating an assessment of concurrent or future reading ability from said first, second, third and fourth variables, wherein said server computer is further configured for generating an assessment of concurrent or future reading with a regression model, wherein the measurement of picture vocabulary includes asking the individual to name a pictured object and/or asking the individual to select a picture of a spoken word to match the spoken word
wherein said step of generating an assessment of concurrent or future reading ability comprises a formula as follows:

Future Assessment Score=$y+C_{PNV}$PNV+$C_{PA}$PA+$C_{RN}$RN+$C_{SLW}$SLW wherein FutureAssessmentScore is said assessment of concurrent or future reading ability for a predefined grade, y is a constant, $C_{PNV}$, $C_{PA}$, $C_{RN}$, and $C_{SLW}$ are coefficients, and PNV is said measurement of picture vocabulary, PA is said measurement of phonemic awareness, RN is said measurement of rapid naming, and SLW is said measurement of single letter or word naming.

35. The system of claim 34, wherein said server computer is further configured for generating an assessment of concurrent or future reading ability with an empirically-based model of actual clinical experience.

36. The system of claim 34, wherein said server computer is further configured for generating an assessment of concurrent or future reading ability by assigning a weighting coefficient to each of the first, second, third and fourth variables.

37. The system of claim 36, wherein the weighting coefficient assigned to the fourth variable is greater than the weighting coefficients assigned to each of the first, second, and third variables.

38. The system of claim 36, wherein the weighting coefficient assigned to the first variable is greater than the weighting coefficients assigned to each of the second, third, and fourth variables.

39. The system of claim 36, wherein the weighting coefficient assigned to the fourth variable is greater than the weighting coefficients assigned to each of the first, second and third variables by a factor of about two.

40. The system of claim 34, wherein the measurement of picture naming vocabulary comprises one or more of a Boston Naming Test and a Peabody Picture Vocabulary Test.

41. The system of claim 34, wherein the measurement of phonemic awareness comprises one or more of a Test of Auditory Analysis Skills and a Phonemic Analysis Composite Test.

42. The system of claim 34, wherein the measurement of rapid naming comprises a Rapid Automatized Naming Test.

43. The system of claim 34, wherein the measurement of single letter or word naming comprises one or more of a Woodcock-Johnson Letter Word Identification Test and a Decoding Skills Test-Real Word Subtest.

44. The system of claim 34, wherein said server computer is configured for identifying individuals for remedial or preventative instruction.

45. The system of claim 34, wherein said server computer is configured for recommending remedial or preventative instruction based on the future reading ability prediction.

46. The predictive reading assessment system of claim 34 wherein said server computer further comprises:
assessment tests, said assessment tests comprising a first picture naming vocabulary test, a second phonemic awareness test, a third rapid naming test, and
a fourth single letter or word naming test; and
a scorer;
wherein said client computers are configured to download said assessment tests from said server computer, and wherein each of said client computers further comprises:
a means for displaying at least one of a graphical image associated with each of said assessment tests located on the server;
a means for receiving a user response to at least one the graphical images associated with each of said assessment tests; and means for communicating the user responses for each of said assessment tests back to said server computer; and
wherein said scorer is configured for determining said measurement of picture naming vocabulary, said measurement of phonemic awareness, said measurement of rapid naming, and said measurement of single letter or word naming based on the user response to the at least one graphical image associated with each of said assessment tests.

47. The system of claim 46, wherein said server computer is configured to administer each of said assessment test in less than about 30 minutes.

48. The system of claim 46, wherein said server computer is configured to administer each of said assessment test in less than about 20 minutes.

49. A computer program product for predicting reading assessment, the computer program product comprising a non-transient computer usable storage medium having computer readable program code embodied in the medium, the computer readable program code comprising:
computer readable program code that detects a plurality of variables, said plurality of variables comprising: a first variable comprising a measurement of picture naming vocabulary; a second variable comprising a measurement of phonemic awareness; a third variable comprising a measurement of rapid naming; and a fourth variable comprising a measurement of single letter or word naming; and
computer readable program code that generates an assessment of future reading ability from said first, second, third and fourth variables;
computer readable program code that generates the assessment of future reading ability with a regression model, wherein the measurement of picture vocabulary includes asking the individual to name a pictured object and/or asking the individual to select a picture of a spoken word to match the spoken word;
wherein said assessment of future reading ability are calculated using the following formula:

$$\text{Future Assessment Score} = y + C_{PNV}\text{PNV} + C_{PA}\text{PA} + C_{RN}\text{RN} + C_{SLW}\text{SLW}$$

wherein Future Assessment Score is said assessment of concurrent or future reading ability for a predefined grade, y is a constant, $C_{PNV}$, $C_{PA}$, $C_{RN}$, and $C_{SLW}$ are coefficients, and PNV is said measurement of picture vocabulary, PA is said measurement of phonemic awareness, RN is said measurement of rapid naming, and SLW is said measurement of single letter or word naming.

50. A computer program product according to claim 49, further comprising:
computer readable program code that generates the assessment of future reading ability with an empirically-based model of actual clinical experience.

51. A computer program product according to claim 49, further comprising:
computer readable program code that assigns a weighting coefficient to each of the first, second, third and fourth variables.

52. A computer program product according to claim 51, further comprising:
computer readable program code that assigns a weighting coefficient to the fourth variable that is greater than the weighting coefficients assigned to each of the first, second, and third variables.

53. A computer program product according to claim 51, further comprising:
computer readable program code that assigns a weighting coefficient to the fourth variable that is greater than the weighting coefficients assigned to each of the first, second and third variables by a factor of about two.

54. A computer program product according to claim 49, further comprising:
computer readable program code for administering assessment tests, said assessment tests comprising a first picture naming vocabulary test, a second phonemic awareness test, a third rapid naming test, and a fourth single letter or word naming test.

55. A computer program product according to claim 49, further comprising:
computer readable program code for scoring said assessment tests.

56. A system for studying the effect of a variable factor on reading ability, comprising:
a database for storing a plurality of variable categories with each one of said categories being stored for each one of a plurality of subjects, said plurality of variable categories comprising: a variable factor; a first variable comprising a measurement of picture vocabulary; a second variable comprising a measurement of phonemic awareness; a third variable comprising a measurement of rapid naming; a fourth variable comprising a measurement of single letter or word naming; and, optionally, an assessment of concurrent or future reading ability generated from said first, second, third and fourth variables; and
a computer processor in communication with the database configured for comparing the variable factor with (i) at least one of the first variable, the second variable, the third variable, the fourth variable, or (ii) the assessment of concurrent or future reading ability, wherein the measurement of picture vocabulary includes asking the individual to name a pictured object and/or asking the individual to select a picture of a spoken word to match the spoken word;

wherein said assessment of concurrent or future reading ability are calculated using the formula as follows:

Future Assessment Score=$y+C_{PNV}$PNV+$C_{PA}$PA+$C_{RN}$RN+$C_{SLW}$SLW wherein FutureAssessmentScore is said assessment of concurrent or future reading ability for a predefined grade, y is a constant, $C_{PNV}$, $C_{PA}$, $C_{RN}$, and $C_{SLW}$ are coefficients, and PNV is said measurement of picture vocabulary, PA is said measurement of phonemic awareness, RN is said measurement of rapid naming, and SLW is said measurement of single letter or word naming.

57. A system according to claim 56, wherein the variable factor comprises epidemiological factor.

58. A system according to claim 56, wherein the variable factor comprises an experimental variable reading instruction.

59. A system according to claim 56, wherein the database is further configured to store an actual assessment of reading ability.

60. A system according to claim 59, wherein the computer processor is further configured for comparing the assessment of future or concurrent reading ability, the actual reading assessment, and the factor.

61. A method for assessing future reading ability in an individual comprising:
  detecting a first variable comprising a measurement of picture vocabulary;
  detecting a second variable comprising a measurement of phonemic awareness;
  detecting a third variable comprising a measurement of rapid naming;
  detecting a fourth variable comprising a measurement of single letter or word naming; and
  then generating, using a computer processor, an assessment of present or future reading ability from said first, second, third and fourth variables, wherein said generating is carried out with a regression model and wherein the measurement of picture vocabulary includes asking the individual to name a pictured object and/or asking the individual to select a picture of a spoken word to match the spoken word, wherein said generating is carried out with an empirically-based model of actual clinical experience and further comprises assigning a weighting coefficient to each of the first, second, third and fourth variables, wherein the measurement of picture vocabulary comprises one or more of a Boston Naming Test and a Peabody Picture Vocabulary Test, the measurement of phonemic awareness comprises one or more of a Phonemic Analysis Composite Test and the Test of Auditory Analysis Skills, the measurement of rapid naming comprises a Rapid Automatized Naming Test, the measurement of single letter or word naming comprises one or more of a Decoding Skills Test-Real Word Subtest and the Woodcock-Johnson Letter Word Identification Test, and all of said detecting steps are performed in less than about 30 minutes;

wherein said assessment of present or future reading ability are calculated using the following formula:

Future Assessment Score=$y+C_{PNV}$PNV+$C_{PA}$PA+$C_{RN}$RN+$C_{SLW}$SLW wherein FutureAssessmentScore is said assessment of concurrent or future reading ability for a predefined grade, y is a constant, $C_{PNV}$, $C_{PA}$, $C_{RN}$, and $C_{SLW}$ are coefficients, and PNV is said measurement of picture vocabulary, PA is said measurement of phonemic awareness, RN is said measurement of rapid naming, and SLW is said measurement of single letter or word naming.

62. The method of claim 1, wherein a value of y varies based on said predefined grade of said assessment of present or future reading ability.

63. The method of claim 62, wherein values of $C_{PNV}$, $C_{PA}$, $C_{RN}$, and $C_{SLW}$ vary based on said predefined grade of said assessment of present or future reading ability.

64. The method of claim 63, wherein said assessment of present or future reading ability for said predefined grade comprises a predetermined test, and a value of y varies based on said predefined test.

65. The method of claim 64, wherein values of $C_{PNV}$, $C_{PA}$, $C_{RN}$, and $C_{SLW}$ vary based on said predefined test.

* * * * *